(12) United States Patent
Tokimoto

(10) Patent No.: US 7,903,098 B2
(45) Date of Patent: Mar. 8, 2011

(54) DISPLAY DEVICE, CENTER DEVICE, VIDEO DISPLAY SYSTEM, DISPLAY DEVICE CONTROL METHOD, CENTER DEVICE CONTROL METHOD, DISPLAY DEVICE CONTROL PROGRAM, CENTER DEVICE CONTROL PROGRAM, AND RECORDING MEDIUM CONTAINING THE PROGRAM

(75) Inventor: Toyoshi Tokimoto, Otawara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1105 days.

(21) Appl. No.: 10/553,352

(22) PCT Filed: Apr. 15, 2004

(86) PCT No.: PCT/JP2004/005438
§ 371 (c)(1),
(2), (4) Date: Aug. 2, 2006

(87) PCT Pub. No.: WO2004/105386
PCT Pub. Date: Dec. 2, 2004

(65) Prior Publication Data
US 2006/0267894 A1    Nov. 30, 2006

(30) Foreign Application Priority Data

Apr. 17, 2003 (JP) .................................. 2003-113363
Apr. 13, 2004 (JP) .................................. 2004-118357

(51) Int. Cl.
*G09G 5/00* (2006.01)

(52) U.S. Cl. .......... 345/204; 348/731; 348/705; 725/120

(58) Field of Classification Search .................. 345/87, 345/204, 76, 82, 60; 348/571, 705, 706, 348/725, 734, 731; 725/151, 139, 131, 100, 38, 59, 82, 78, 120
See application file for complete search history.

(56) References Cited

U.S. PATENT DOCUMENTS

| 5,754,258 | A   |   | 5/1998 | Hanaya et al. |
|-----------|-----|---|--------|---------------|
| 5,966,162 | A   | * | 10/1999 | Goode et al. ..................... 725/90 |
| 6,384,868 | B1  | * | 5/2002 | Oguma .......................... 348/564 |
| 6,396,549 | B1  | * | 5/2002 | Weber ........................... 348/734 |
| 6,519,009 | B1  |   | 2/2003 | Hanaya et al. |

(Continued)

FOREIGN PATENT DOCUMENTS

CA    2 258 823 A1    7/1999

(Continued)

*Primary Examiner* — Stephen G Sherman
(74) *Attorney, Agent, or Firm* — Birch, Stewart, Kolasch & Birch, LLP

(57) ABSTRACT

A TV microcomputer sends a channel switching demand command to a wireless center microcomputer, via an SS transmission/reception unit and an SS transmission/reception unit. Via the SS transmission/reception unit and the SS transmission/reception unit, the wireless center microcomputer returns, to the TV microcomputer, a response indicating that the command demanding the channel selection has been received. Subsequently, the wireless center microcomputer performs a process demanded by the received channel switching demand, and sends, to the TV microcomputer, process completion information indicating that the process has been performed. Receiving the process completion information, a TV main body performs muting of the screen for a certain period starting from the reception of the information, so as to hide the visual disturbance on account of the delay at the time of the channel switching.

23 Claims, 10 Drawing Sheets

U.S. PATENT DOCUMENTS

| | | |
|---|---|---|
| 2002/0040481 A1 | 4/2002 | Okada et al. |
| 2002/0059585 A1 | 5/2002 | Maeda et al. |
| 2003/0101452 A1 | 5/2003 | Hanaya et al. |
| 2003/0200551 A1* | 10/2003 | Kang ............................ 725/120 |
| 2004/0068482 A1 | 4/2004 | Yoshida et al. |
| 2004/0215796 A1 | 10/2004 | Maeda et al. |
| 2006/0123460 A1 | 6/2006 | Okada et al. |

FOREIGN PATENT DOCUMENTS

| | | |
|---|---|---|
| JP | 8-181926 A | 7/1996 |
| JP | 11-275477 A | 10/1999 |
| JP | 2001-160927 A | 6/2001 |
| JP | 2001-285736 A | 10/2001 |
| JP | 2001-292381 A | 10/2001 |
| JP | 2001-358966 A | 12/2001 |
| JP | 2002-112138 A | 4/2002 |
| JP | 2002-165148 A | 6/2002 |
| JP | 2002-354064 A | 12/2002 |
| JP | 2002354064 A * | 12/2002 |
| WO | WO-01/77852 A1 | 10/2001 |

* cited by examiner

DISPLAY DEVICE, CENTER DEVICE, VIDEO DISPLAY SYSTEM, DISPLAY DEVICE CONTROL METHOD, CENTER DEVICE CONTROL METHOD, DISPLAY DEVICE CONTROL PROGRAM, CENTER DEVICE CONTROL PROGRAM, AND RECORDING MEDIUM CONTAINING THE PROGRAM

TECHNICAL FIELD

The present invention relates to a display device, center device, image display system, display device control method, center device control method, display device control program, center device control program, and a recording medium containing the program, with which the center device sends image data to the display device and the display device reproduces images based on the image data.

BACKGROUND ART

For visual and audio reception/reproduction systems (AV (Audio Visual) systems), many types of thin liquid crystal display devices have recently been developed as a monitor section (AV output device) that reproduces (displays) images. A liquid crystal display device is greatly advantageous in that a display screen can be enlarged while the display device remains light and thin.

Utilizing this advantage, there is such a system disclosed that a tuner section of a television receiver is separated from a monitor section of the television receiver, and an image signal and an audio signal are supplied from the tuner section to the monitor section. In this system, the tuner section thus separated is provided with an antenna wire to allow for channel selection, and images based on an AV signal are reproduced by wirelessly supplying the image and audio signals (AV signal) of the selected channel to the monitor section (e.g. Patent Documents 1 and 2).

Patent Document 1 is Japanese Laid-Open Patent Application No. 2001-160927 (published on Jun. 12, 2001).

Patent Document 2 is Japanese Laid-Open Patent Application No. 2001-358966 (published on Dec. 26, 2001).

According to the aforesaid system, in response to an operation such as channel selection and input switching on the monitor side, a command corresponding to the operation is generated on the monitor side and supplied to the tuner side. This command prompts the execution of a process on the tuner side, and is transmittable on a wireless transmission system associating the monitor side with the tuner side. The monitor side in this case transmits the command at an interval specified by the wireless transmission system.

Meanwhile, on the tuner side, the channel selection, input switching, or the like is performed in response to the command. Subsequently, on the tuner side, an image signal having been subjected to the channel selection or input switching is converted to stream information. This stream information is wirelessly transmitted to the monitor side. The conversion to the stream information is, for instance, MPEG (Moving Picture Expert Group) 2 conversion. Since this MPEG2 conversion takes some time, undesirable visual disturbance occurs for several seconds on the screen on the monitor side, during a period in which a process concerning the channel selection or input switching is performed on the tuner side. To avoid this problem, for instance, image display on the screen is stopped for not less than several seconds. Note that, hereinafter, stopping the image display is referred to as "to mute".

When the MPEG2 conversion is performed in this manner, a delay time related to switching, e.g. a delay time concerning encoding, is relatively long, and hence a period of visual disturbance on the monitor side is also relatively long.

In addition to the above, it is impossible on the monitor side to recognize when an image signal to be supplied is switched, after a demand of channel selection or input switching is, by means of a command, sent to the tuner side. On this account, the management of a mute period is performed based on a time at which the demand is made. Also, to hide the visual disturbance by means of the muting, when the visual disturbance disappears is estimated and the muting is terminated after that estimated time. In this manner, there has been such a problem in the conventional art that the mute period must be longer than an actual period of visual disturbance.

The present invention was done to solve the above-identified problem, and the objective of the present invention is to provide, for instance, an image display system that allows the mute period to approximate to the actual period of visual disturbance.

Another objective of the present invention is to provide a technology that makes it possible to grasp an image mute timing on the display device side and to properly perform the time setting.

DISCLOSURE OF INVENTION

To achieve the above-identified objective, a display device of the present invention displays an image based on image data supplied from a center device, the display device being characterized by comprising: receiving means for receiving data from the center device; and control means for controlling the display device, the control means including: visual disturbance hiding means that hides disturbance in the image on account of image switching, when the display device obtains, via the receiving means, switching-related data indicating information with regard to the image switching of the image data by the center device.

Examples of the information regarding the image switching are: information indicating that the switching operation has started; information indicating that the switching is being performed; and information indicating that the switching operation has been finished, and so on. Examples of the method of hiding the visual disturbance include: (i) stop image display (image muting); (ii) display a still image displayed immediately before the hiding starts; and (iii) display a predetermined image such as a solid blue image and a phrase "please wait a moment", and so on. Among these examples, the image muting to stop image display is preferable.

According to the arrangement above, the hiding of the visual disturbance on account of the image switching is performed in a case of acquiring the switching-related data from the center device, rather than at the time of instructing the center device to perform the image switching. This allows the time point of starting the hiding to be close to the time point at which the visual disturbance starts, as compared to the conventional arrangements. As a result, the period for the hiding is shortened.

The switching-related data preferably indicates that the image switching has been finished. In that event, assuming that, for instance, the image input is switched from the external input 1 to the external input 2, the time point at which the image switching is finished is identical with a time point at which the switching to the external input 2 is performed and the encoding starts. This allows the time point of starting the hiding to be further close to the time point at which the visual disturbance starts.

By the way, there is a delay time from the receipt of the image data by the display device to the start of image display. On this account, the period during which the visual disturbance hiding means performs the hiding is preferably set in accordance with that delay time.

In a typical arrangement, the center device encodes and transmits the image data, and the display device receives and decodes the encoded image data. When the encoding process includes image compression, periods required for encoding and decoding are relatively longer than the periods for other operations.

Taking account of this, preferably the display device further includes decoding means for decoding the encoded image data, and the period during which the visual disturbance hiding means performs the hiding is set in accordance with a period required by the decoding means to decode the image data.

When the aforesaid delay time elapses from the time point at which the switching-related data is obtained, the visual disturbance has not occurred. For this reason, the visual disturbance hiding means preferably starts the hiding when the aforesaid delay time elapses from the time point at which the switching-related data is obtained. In that event, the time point at which the hiding starts is further brought close to the time point at which the visual disturbance starts.

Incidentally, in a case where the decoding of the image data is performed, the visual disturbance may occur during the decoding. On this account, the visual disturbance hiding means preferably starts the hiding at a time point at which a certain time elapses from the time point at which the switching-related data is obtained, the certain time being shorter than the delay time by a time required for decoding the image data by the decoding means.

To achieve the above-described objective, the display device of the present invention displays an image based on image data supplied from a center device, the display device being characterized by comprising: receiving means for receiving data from the center device; decoding means for decoding the image data having been encoded; and control means for controlling the display device, the control means including visual disturbance hiding means that hides disturbance of the image on account of image switching of the image data by the center device, and the visual disturbance hiding means determining when to stop hiding the disturbance, in accordance with a time point at which the display device receives, via the receiving means, a first stamp generated when the center device encodes the switched image data.

According to this arrangement, the time point at which the visual disturbance hiding means finishes the hiding is set in accordance with the time point at which the display device obtains the first time stamp generated at the time when the center device encodes the switched image data. Obtaining the first time stamp, it is possible to understand that the image data switched as a result of the image switching has been encoded.

The image data after being subjected to the image switching and encoding is then decoded in the display device, and an image is displayed based on the decoded image data. As a result, the visual disturbance on account of the image switching does not occur. In this manner, it is possible to estimate a time point at which the visual disturbance ends, in reference to the time point of the encoding. When the hiding is finished at that estimated time point, the time point at which the hiding is finished is brought close to the time point at which the visual disturbance finishes, as compared to the conventional arrangements. On this account, the period for the hiding is shortened.

In the decoding means, a time point at which the decoding of the image data starts is set. On this account, the time period at which the visual disturbance hiding means finishes the hiding is preferably set in accordance with (i) the time point at which the first time stamp is obtained and (ii) the second time stamp indicating the time point at which the decoding means starts the decoding of the image data. This makes it possible to more accurately estimate the time point at which the visual disturbance ends, in reference to the time point of starting the decoding of the image data. For this reason, the period for the hiding is further shortened.

By the way, the switching of the image data is typically instructed using the remote controller or the like, by the user on the display device side. For this reason, preferably the display device further includes transmission means transmitting data to the center device, and the control means further includes switching command transmission control means for controlling and causing the transmission means to send, to the center device, switching demand data that demands the switching of the image data.

To achieve the above-identified objective, the center device of the present invention transmits image data to a display device in order to display an image on the display device, the center device being characterized by comprising: transmission means for transmitting data to the display device; image switching means for switching the image data to be transmitted; and control means for controlling the center device, the control means including switching-related data transmission control means that obtains switching-related data indicating information regarding an operation of switching the image data by the image switching means, so as to control and cause the transmission means to send the obtained switching-related data to the display device.

Examples of the above-described image switching means include a tuner for selecting image data of being currently broadcast, selector for selecting one of sets of externally-supplied image data, and a combination of these devices.

According to the arrangement above, the information regarding the switching of the image data is supplied to the display device. With this, the time point at which the display device starts the hiding is brought close to the time point at which the visual disturbance starts, as compared to the conventional arrangements. On this account, the period of hiding is shortened.

As described above, the switching-related data preferably indicates that the video switching means has finished the switching of the image data. In that event, the time point at which the hiding starts is further brought close to the time point at which the visual disturbance starts.

To reduce a data amount of the image data and to certainly transmit the image data, it is preferable that the center device further include encoding means for encoding the image data, and the transmission means transmit the image data, which has been encoded by the encoding means, to the display device.

To achieve the above-identified objective, the center device of the present invention transmits image data to a display device in order to display an image on the display device, the center device being characterized by comprising: transmission means for transmitting data to the display device; image switching means for switching the image data to be transmitted; encoding means for encoding the image data; and control means for controlling the center device, the control means including time stamp transmission control means that controls and causes the transmission means to obtain a first time stamp generated when the encoding means encodes the image data switched by the image switching means, and send the obtained first time stamp to the display device.

According to the arrangement, the time stamp transmission control means controls the transmission means so as to send, to the display device, the first time stamp which is generated at the time of encoding the image data switched by the video switching means. This enables the display device to grasp when the encoding was performed. Based on the time point of encoding, it is possible to estimate when the visual disturbance ends. Terminating the hiding at the estimated time point makes it possible to bring the time point, at which the hiding is terminated, to come closer to the time point at which the visual disturbance ends, as compared to the conventional arrangements. On this account, the time for the hiding is shortened.

Incidentally, the switching of the image data is typically instructed by the user on the display device side, using a remote controller or the like. For this reason, preferably the center device further includes the receiving means for receiving data from the display device, and the control means further includes: switching demand acquiring means for acquiring, via the receiving means, switching demand data for demanding the switching of the image data; and image switching control means for controlling and causing the image switching means to switch the image data in accordance with the switching demand data obtained by the switching demand acquiring means.

The above-described effects can be obtained also by a image display system in which the above-said center device sends image data to the above-said display device, and the display device displays an image based on the image data. The aforesaid center device may be attachable to the aforesaid display device. The transmission of the image data may be performed wirelessly.

To achieve the objective above, a display device control method of the present invention, for controlling a display device that displays an image based on image data supplied from a center device, is characterized in that, a display device includes receiving means that receives data from the center device, and the method comprising the step of, when the display device obtains, via the receiving means, switching-related data indicating information regarding image switching of the image data by the center device, hiding visual disturbance as a result of the image switching.

According to the method, the hiding of the visual disturbance as a result of the image switching is performed in the case of obtaining the switching-related data from the center device, rather than the case of instructing the center device to perform the image switching. On this account, the time point at which the hiding starts is brought close to the time point at which the visual disturbance starts, as compared to the conventional arrangements. The period for the hiding is therefore shortened.

To achieve the objective above, a display device control method of the present invention, for controlling a display device that displays an image based on image data supplied from a center device, is characterized in that, a display device includes: receiving means for receiving data from the center device; and decoding means for decoding the image data having been encoded, the method comprising the steps of: hiding disturbance of the image, which is caused by image switching of the image data by the center device; and determining a time to stop hiding the disturbance, based on a time when the display device obtains, via the receiving means, a first time stamp generated at an instant of encoding the switched image data.

According to this method, the time point at which the hiding finishes is determined based on the time of obtaining the first time stamp generated on the occasion of encoding the switched image data by the center device. Obtaining the first time stamp, it is possible to understand that the image data that has been switched in the image switching has been encoded. This makes it possible to estimate when the visual disturbance ends, in reference to the time point of the encoding. Terminating the hiding at this estimated time point, the time point at which the hiding finishes is brought close to the time point at which the visual disturbance ends, as compared to the conventional arrangements. On this account, the period of hiding is shortened.

To achieve the objective above, a center device control method according to the present invention, for controlling a center device that sends image data to a display device in order to display an image on the display device, is characterized in that, the center device includes: transmission means for transmitting data to the display device; and image switching means for switching the image data to be transmitted, the method comprising the step of controlling and causing the transmission means to obtain switching-related data indicating information regarding such an operation that the image switching means switches the image data, and to transmit the obtained switching-related data to the display device.

According to the method, information regarding the switching of the image data is supplied to the display device. This causes the time point at which the display device starts the hiding to be brought close to the time point at which the visual disturbance starts, as compared to the conventional arrangements. On this account, the period for the hiding is shortened.

To achieve the objective above, a center device control method of the present invention for controlling a center device that transmits image data to a display device in order to display an image on the display device, is characterized in that the center device includes: transmission means for transmitting data to the display device; image switching means for switching the image data to be transmitted; and encoding means for encoding the image data, the method comprising the step of controlling and causing the transmission means to obtain a first time stamp generated when the encoding means encodes the image data switched by the image switching means, and to transmit the obtained first time stamp to the display device.

According to the method, the transmission means is controlled so that the first time stamp, which is generated when the image data switched by the image switching means is encoded, is supplied to the display device. This enables the display device to grasp when the encoding was performed, and based on this time point, it is possible to estimate when the visual disturbance ends. Finishing the hiding at this estimated time point, the time point of finishing the hiding is brought close to the time point at which the visual disturbance ends, as compared to the conventional arrangements. On this account, the period of the hiding is shortened.

The control means of the display device can be realized on a computer by means of a display device control program. Also, the control means of the center device can be realized on a computer by means of a center device control program. Furthermore, by storing the display device control program and/or the center device control program in a computer-readable recording medium, it is possible to execute the display device control program and/or the center device control program on any computer.

As described above, the display device of the present invention hides the visual disturbance which is caused on account of the image switching, in the case of obtaining the switching-related data from the center device rather than the case of instructing the center device to perform the image switching. This makes it possible to bring the time point of starting the hiding to be close to the time point at which the visual disturbance starts, as compared to the conventional arrangements. This makes it possible to shorten the period for the hiding.

For a fuller understanding of the nature and advantages of the invention, reference should be made to the ensuing detailed description taken in conjunction with the accompanying drawings.

BEST MODE FOR CARRYING OUT THE INVENTION

A wireless AV system of the present invention is arranged in such a manner that, an AV output device (on the monitor side) is separated from a wireless center (on the tuner side), and the monitor side and the tuner side communicate with each other mainly in a wireless manner. Such a system is characterized in that the monitor side obtains, from the tuner side, timing information for channel selection and input switching, so that a mute period for an image displayed on the monitor, on the occasion of switching image input, is properly set. The timing information may be time information indicating when a notification that the channel switching has actually been performed on the tuner side is supplied, in response to, for example, a channel switching requirement from the monitor side to the tuner side. For instance, the image muting is performed for a certain period from the time of receiving the notification on the monitor side. In principle, this shortens the mute period by a delay time in the wireless center, i.e. by the delay time chiefly on account of the MPEG2 encoding, as compared to a conventional mute period.

Embodiment 1

Figure 1:
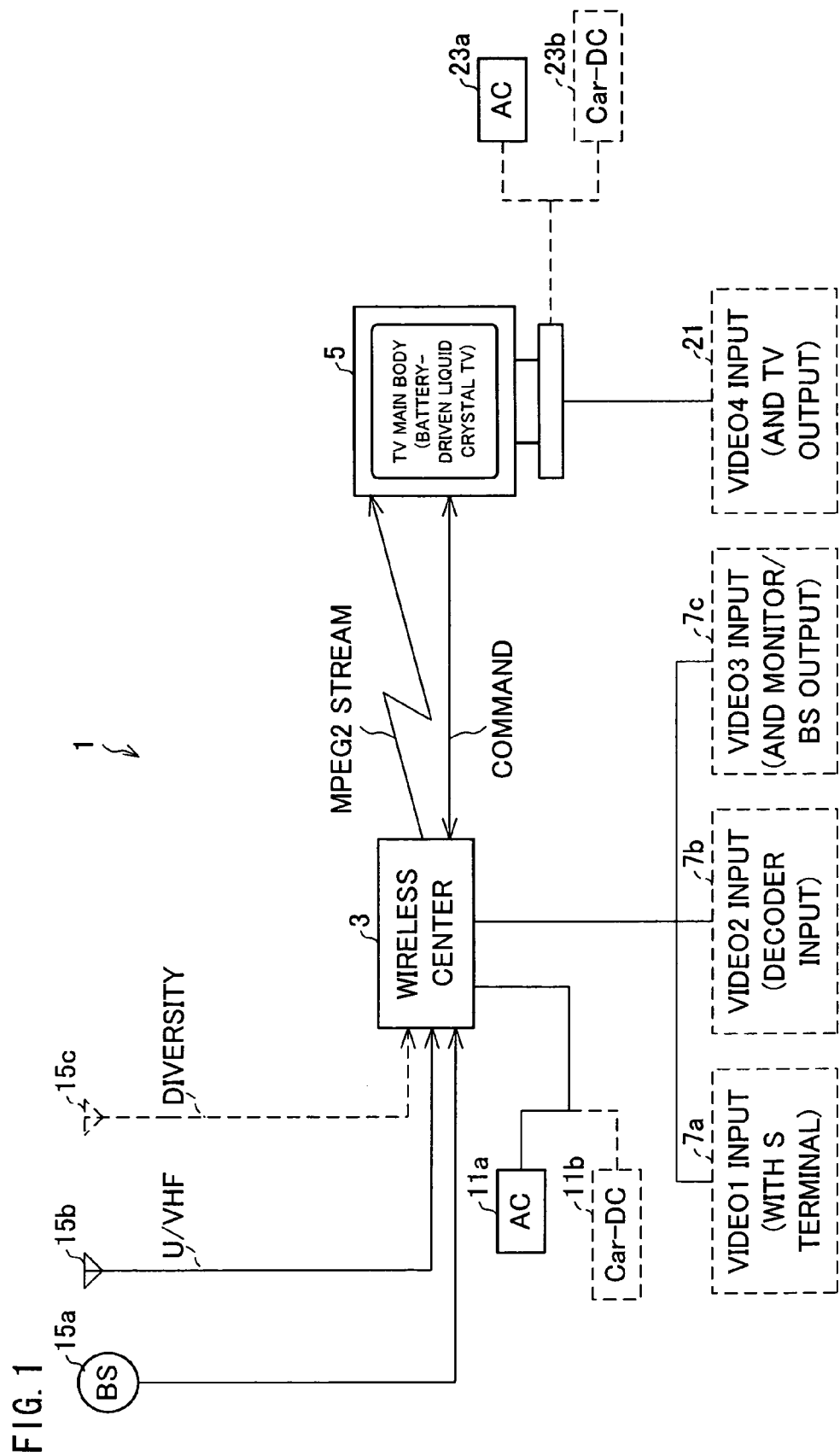
FIG. 1 is a block diagram of a television reception/reproduction system of an embodiment of the present invention.
Figure 2:
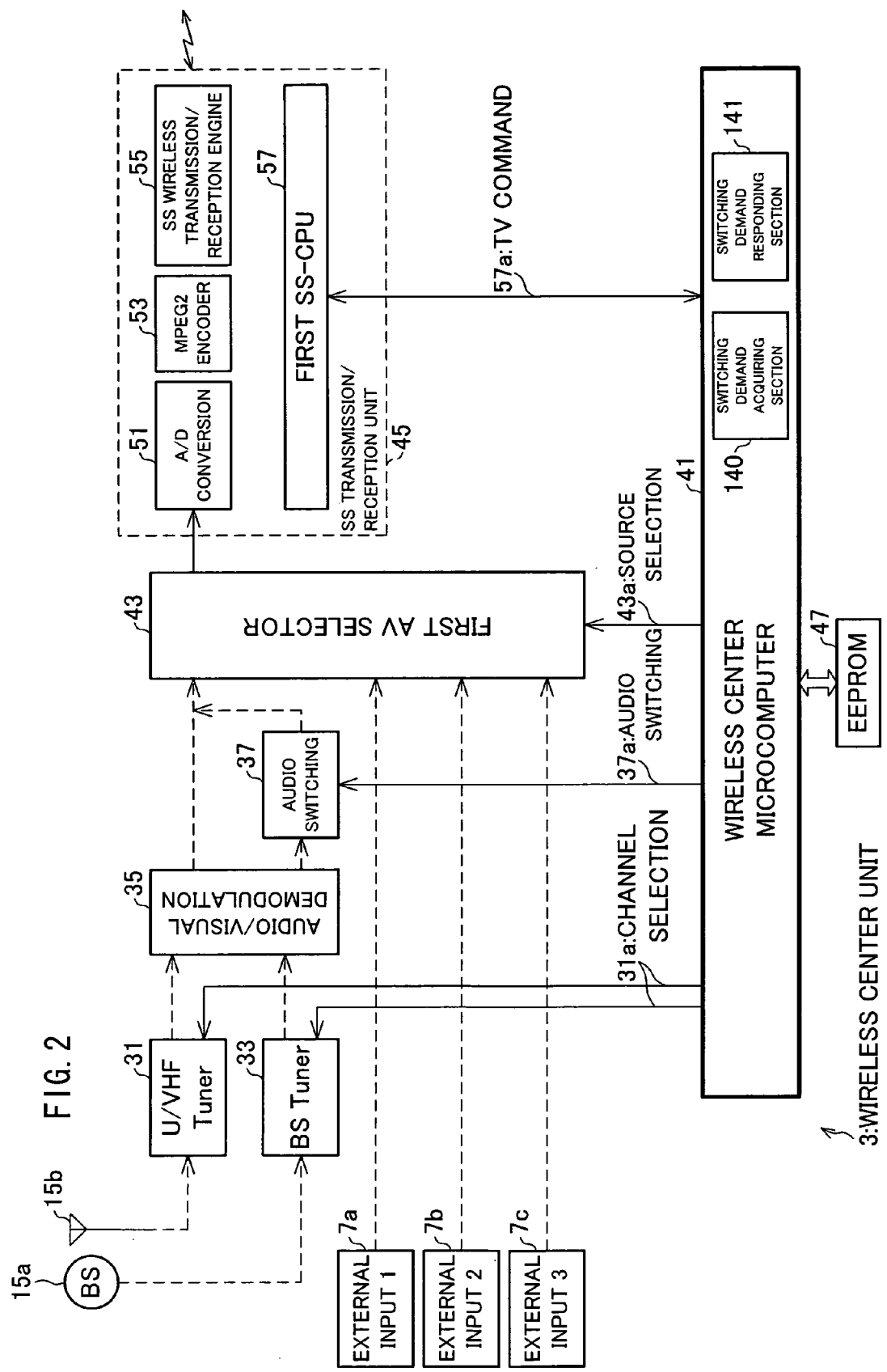
FIG. 2 is a block diagram of a wireless center of the TV reception/reproduction system of FIG. 1.
Figure 3:
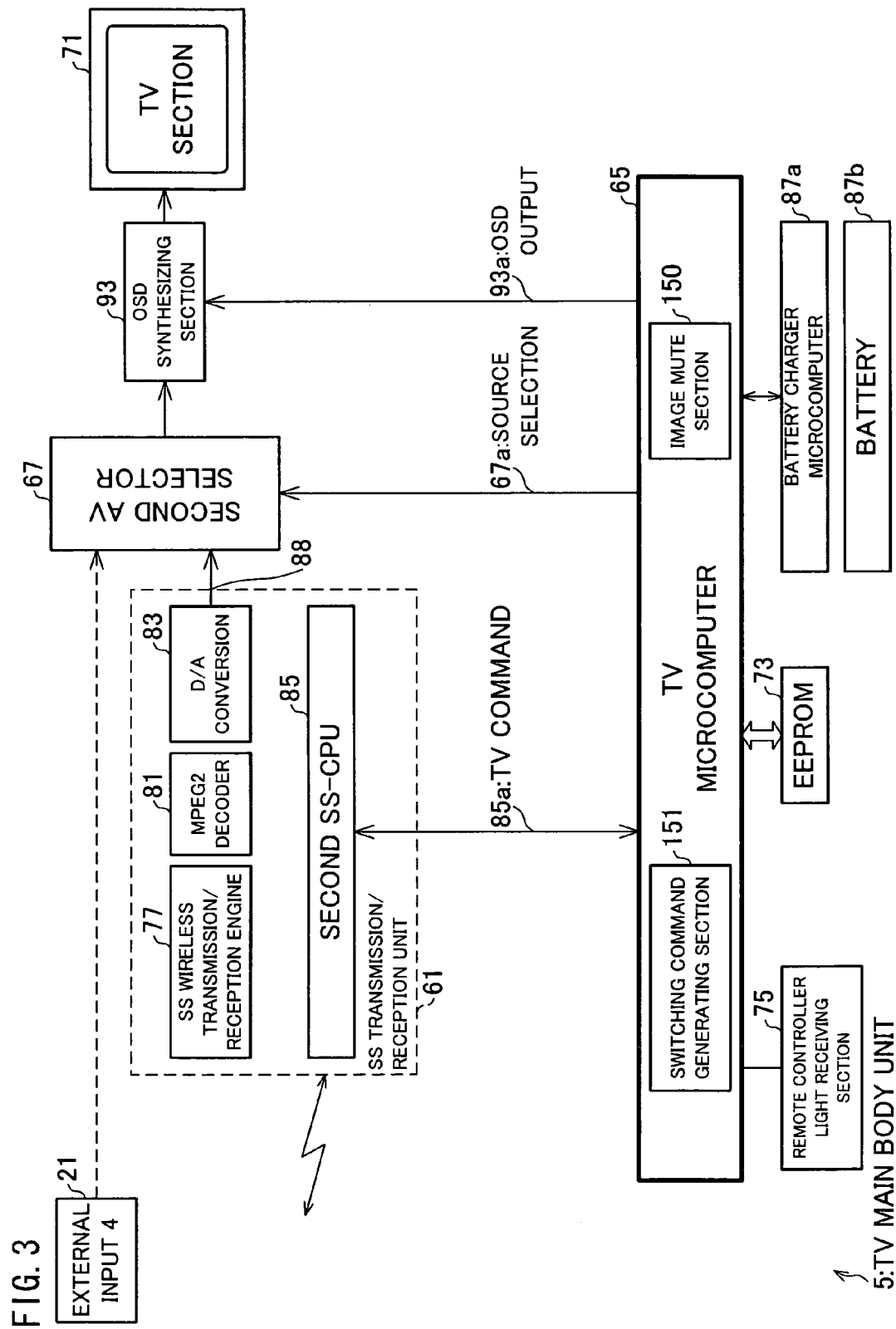
FIG. 3 is a block diagram of a TV main body of the TV reception/reproduction system of FIG. 1.
Figure 4:
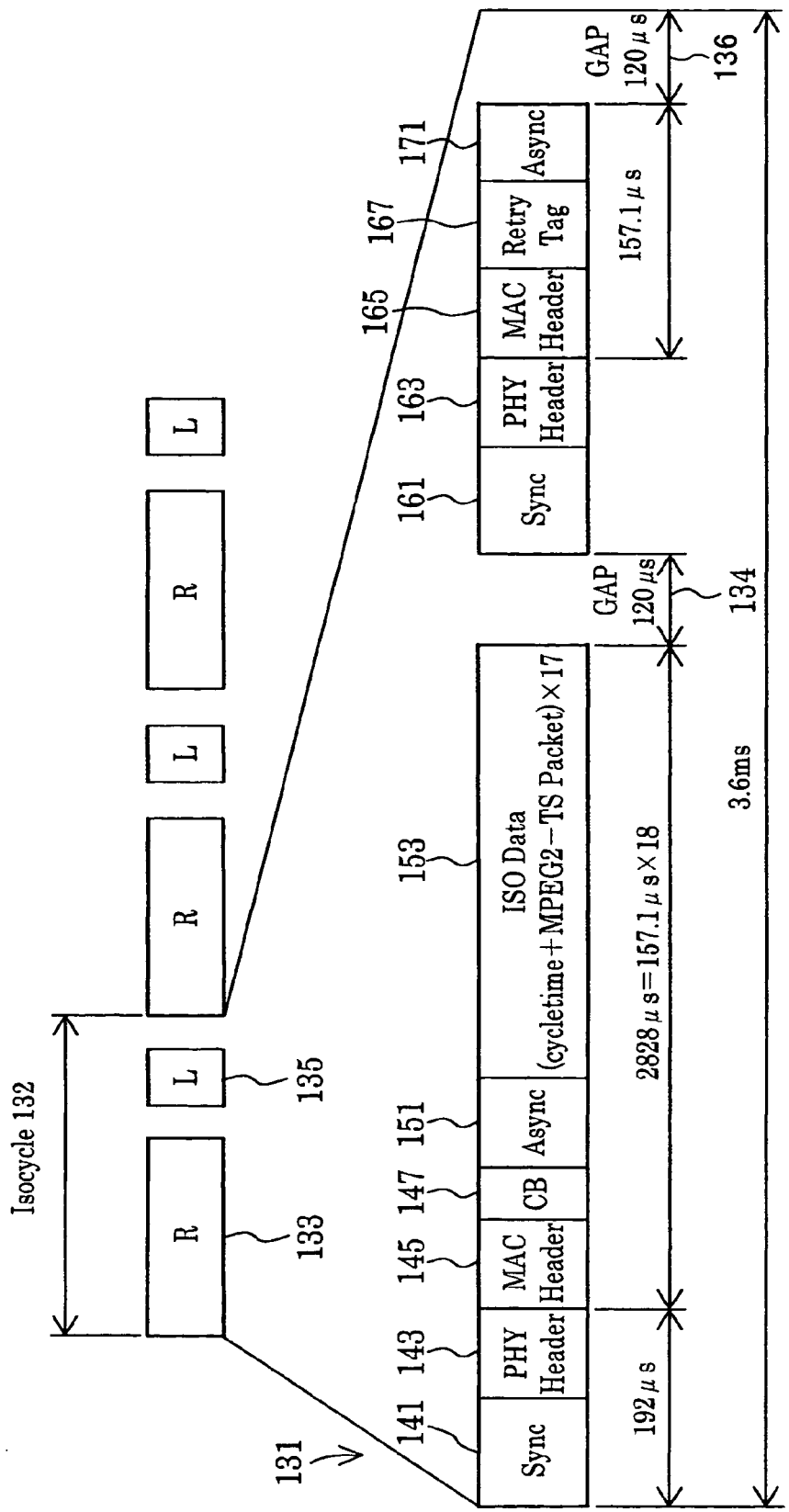
FIG. 4 shows a configuration example of transmission data exchanged between the wireless center unit and TV main body unit in the TV reception/reproduction system of FIG. 1.
Figure 5:
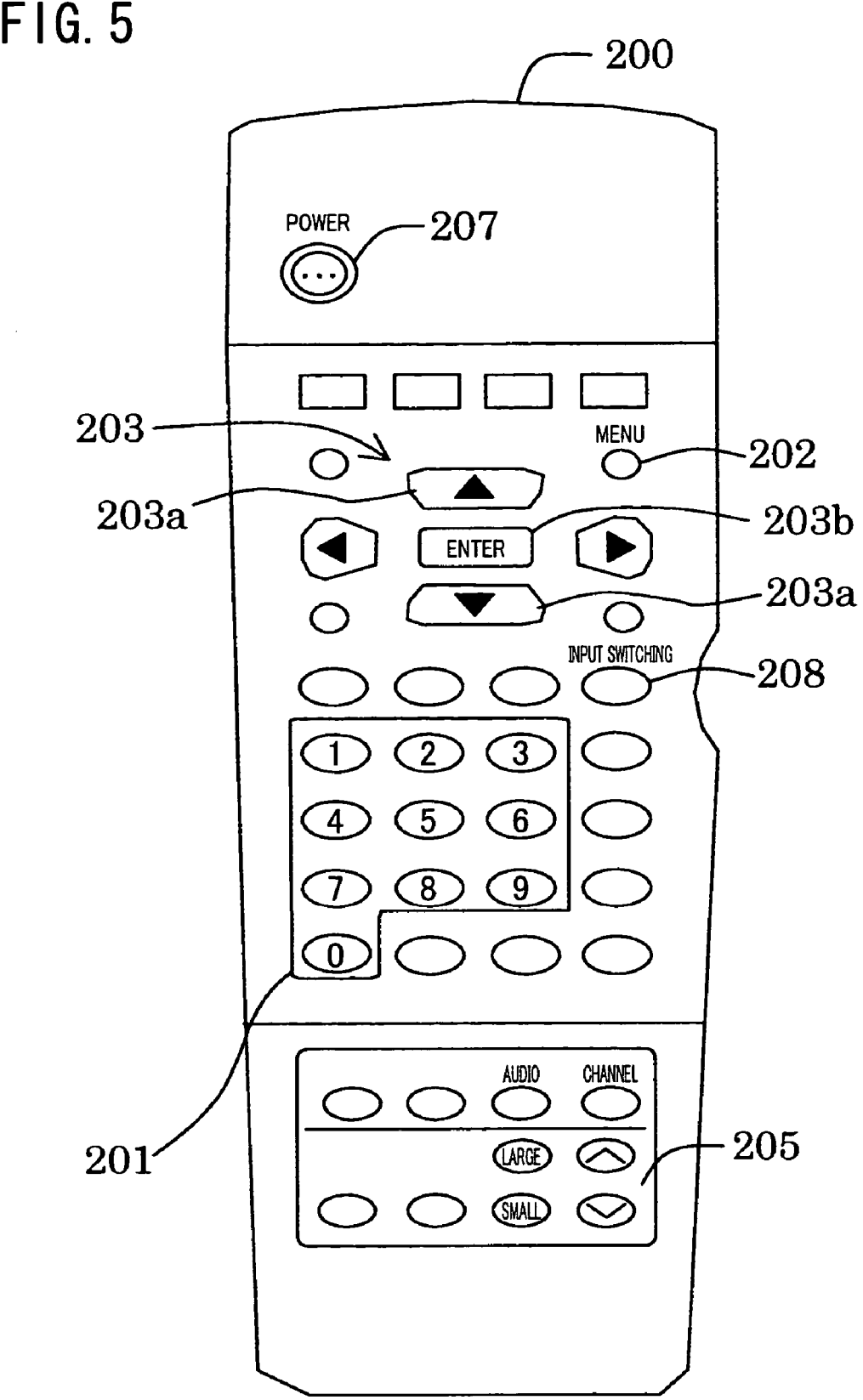
FIG. 5 is a plan view showing a configuration example of a remote controller for the TV main body unit of FIG. 3.
Figure 6:
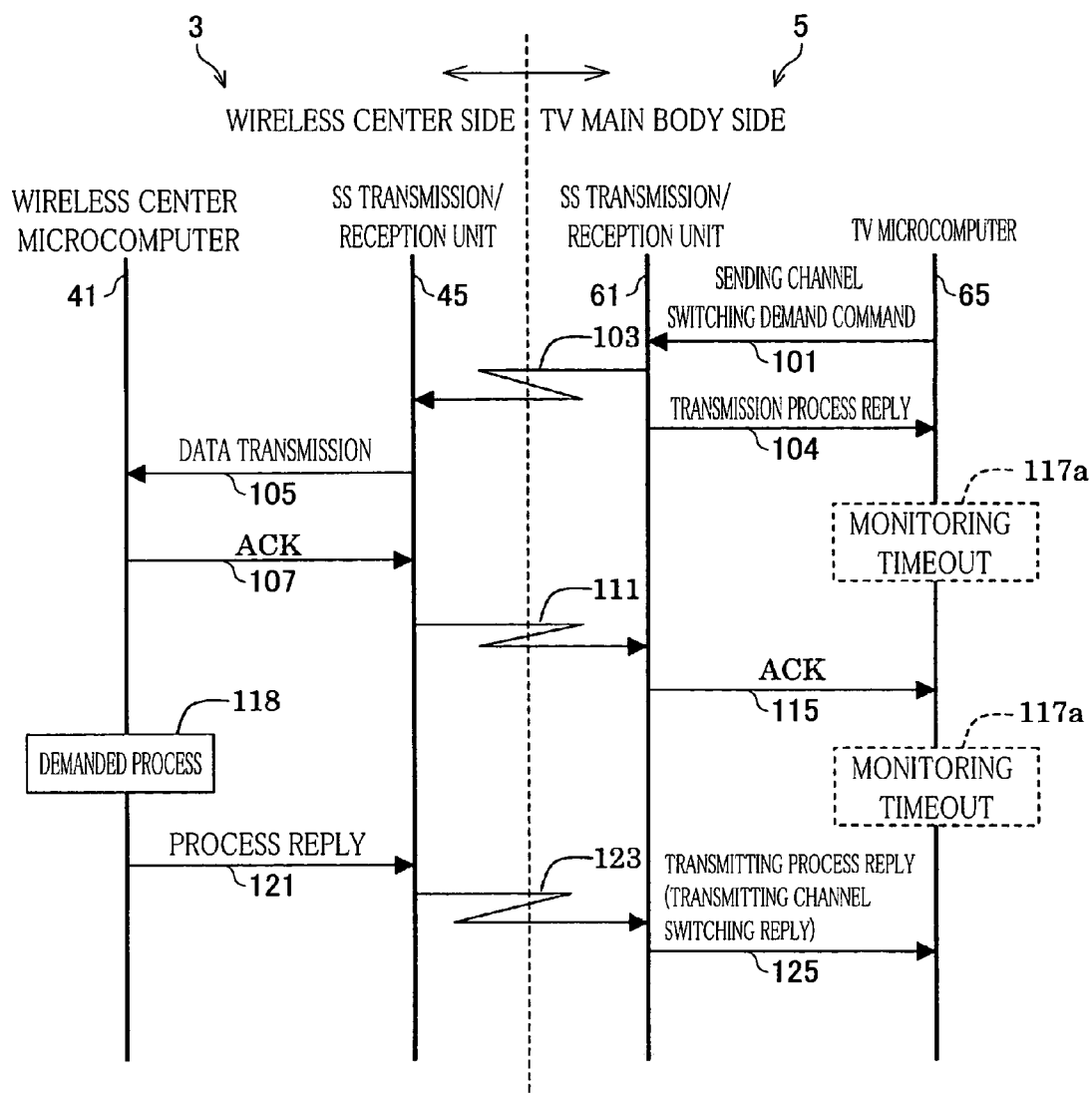
FIG. 6 shows an example of the sequence of two-way transmission between the wireless center unit and TV main body unit of the TV reception/reproduction system of FIG. 1.
Figure 7:
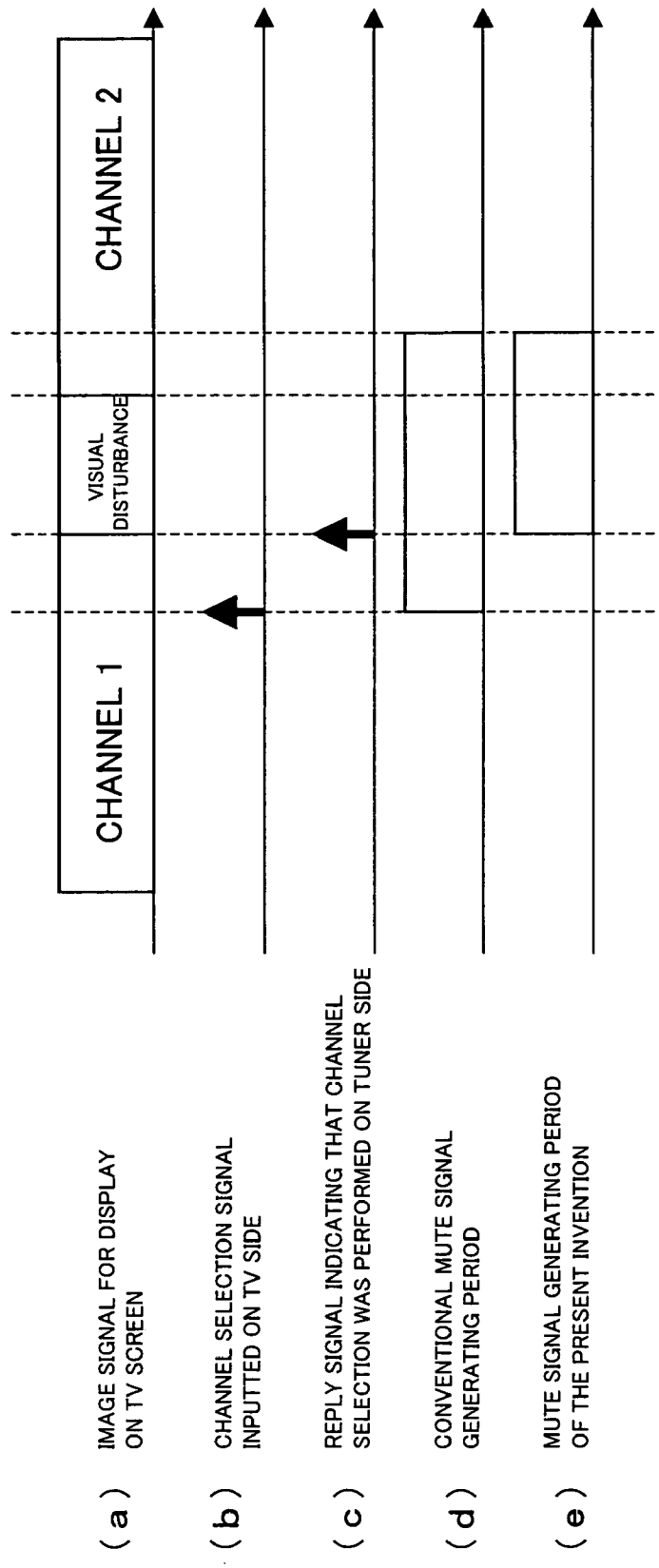
FIG. 7 is a timing chart showing a mute period in the TV reception/reproduction system of FIG. 1, as compared to a conventional mute period.
Figure 10:
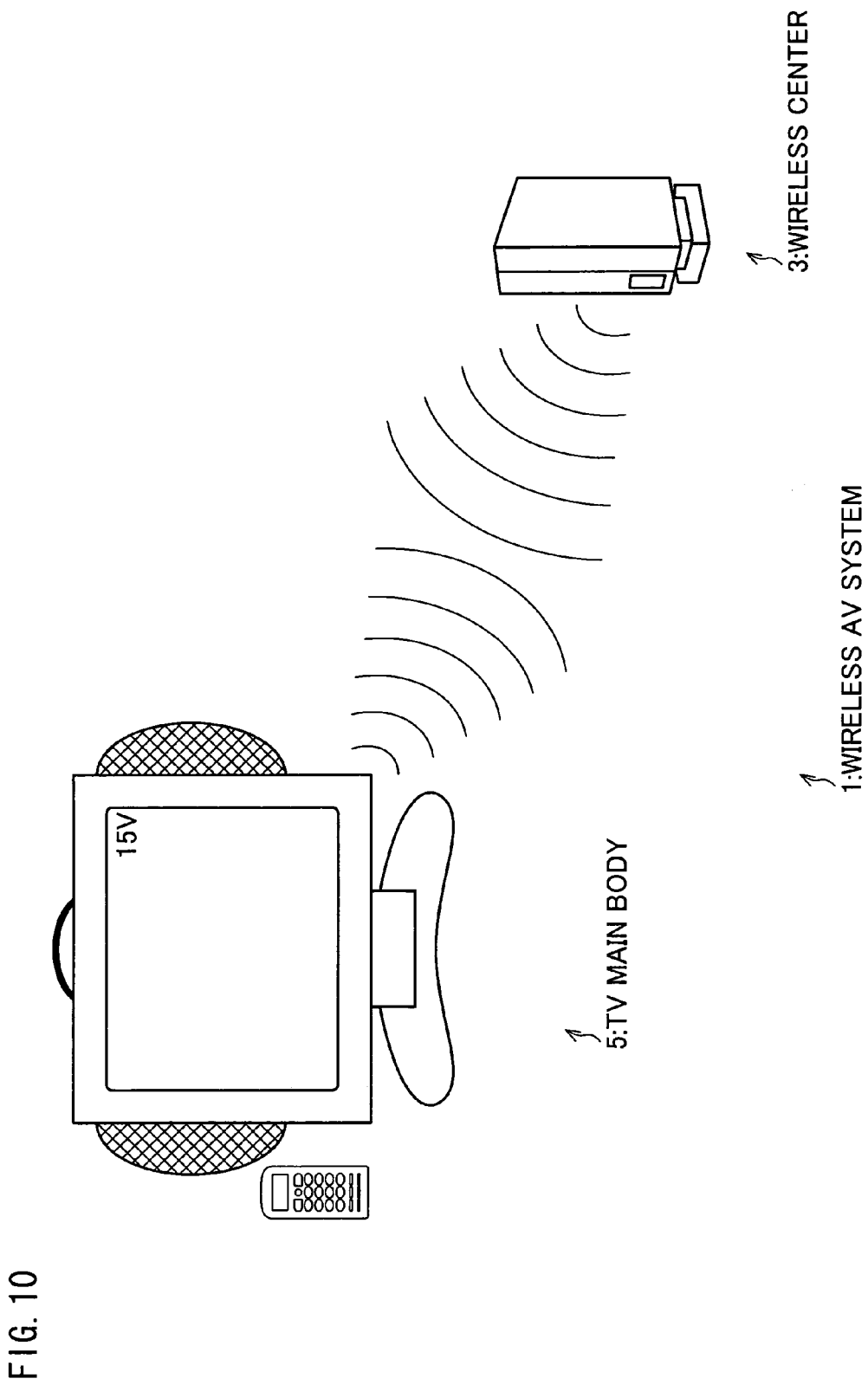
FIG. 10 illustrates the outline of a TV reception/reproduction system that is a wireless TV receiver with a detachable display.

In reference to figures, the following will describe a TV reception/reproduction system as an example of a wireless AV system of a preferred embodiment of the present invention. FIG. 1 illustrates a configuration example of the TV reception/reproduction system of the present embodiment. FIG. 2 is a functional block diagram showing a configuration example of a wireless center unit (tuner-side device) of the TV reception/reproduction system of FIG. 1. FIG. 3 is a functional block diagram showing a configuration example of a TV main body unit (monitor-side device, TV-side device) of the TV reception/reproduction system of FIG. 1. FIG. 4 illustrates a configuration example of the transmission data exchanged in the TV reception/reproduction system of FIG. 1, between the wireless center unit and the TV main body unit. FIG. 5 is a plan view of a configuration example of a remote controller for the TV main body unit of FIG. 3. FIG. 6 illustrates an example of the sequence of two-way transmission between the wireless center unit and TV main unit of the TV reception/reproduction system of FIG. 1. FIG. 7 is a timing chart showing a mute period in the TV reception/reproduction system of FIG. 1, as compared with a conventional mute period. FIG. 10 illustrates the outline of a TV reception/reproduction system that is a wireless TV receiver with a detachable display.

As shown in FIGS. 1 and 10, the TV reception/reproduction system 1 (wireless AV system, image display system) of the present embodiment includes: a wireless center unit (hereinafter, wireless center) 3 as a base device; and a TV (television) main body unit (hereinafter, TV main body) 5 as a portable terminal (wireless terminal). The wireless center 3 (communication device, center device) and the TV main body 5 (communication device, display device) are paired so as to form a wireless transmission network.

As FIG. 10 shows, the TV main body 5 is a wireless battery-driven unit, and has a remote controller for remotely operating a videocassette recorder or the like. The wireless center 3 is connected to, for instance, antennas for broadcasting satellite and U/VHF broadcasting, and AV equipments such as a DVD player and a videocassette recorder. From the wireless center 3 to the TV main body 5, image and/or audio data is supplied wirelessly. Also, between the wireless center 3 and the TV main body 5, a command is two-way transmitted in a wireless manner.

As FIG. 1 shows, the wireless center 3 includes: an image-1 input terminal (including an S terminal) 7a for external input from devices such as a digital VTR and a DVD (Digital Versatile Disc) player; an image-2 input terminal (decoder input) 7b; an image-3 input terminal (for both monitor and BS output) 7c; a power supply terminal through which power is supplied from an AC power source 11a or a Car-DC power source 11b; and antenna terminals (a BS terminal 15a, a UHF/VHF terminal 15b, and a diversity terminal 15c).

The TV main body 5, on the other hand, includes: an image-4 input terminal (also for TV output) 21 for external input from devices such as a digital VTR and a DVD player; and a power supply input terminal through which power is supplied from an AC power source 23a or a Car-DC power source 23b.

The TV main body 5 is a battery-driven mobile or transportable thin display device detachable to the wireless center 3, and not limited to any particular type of display. In other words, examples of the TV main body 5 include a liquid crystal television, inorganic EL display, organic EL display, and plasma display. In the present specification, the TV main body 5 has mainly a display output capability and audio output capability, while the wireless center 3 mainly has a control function for controlling a tuner section and the TV main body 5. In the present embodiment, a thin liquid crystal television display is taken as an example of the TV main body 5.

Between the wireless center 3 and the TV main body 5, data (image and/or audio data) is exchanged based on SS (Spread Spectrum) wireless system under the IEEE 802.11b standard. With this, the wireless center 3 is wirelessly associated with the TV main body 5. Alternatively, 5 GHz band may be used in place of 2.4 GHz band, as the 5 GHz band has recently been opened to the public.

From the wireless center 3 to the TV main body 5, MPEG2 stream information is wirelessly supplied. Also, between the wireless center 3 and the TV main body 5, other types of data such as command data is exchanged in a two-way communication.

Now, a configuration example of a wireless center (tuner-side device) 2 will be described with reference to FIG. 2. Note that, the descriptions on members having already been described with reference to FIG. 1 are omitted.

As FIG. 2 shows, the wireless center 3 includes: a wireless center microcomputer (hereinafter, microcomputer) 41 (control means) for controlling the entirety of the device; a first AV selector 43 (image switching means); and a spread spectrum (SS) transmission unit 45 (communication means, transmission means, receiving means). An image-1 input terminal (external input 1) 7a, an image-2 input terminal (external input 2) 7b, and an image-3 input terminal (external input 3) 7c are associated with an AV selector 43.

The wireless center microcomputer 41 includes a switching demand acquiring section 140 (switching demand acquiring means) and a switching demand responding section 141 (switching-related data transmission control means).

The wireless center 3 further includes: a BS (Broadcasting Satellite) tuner 33 (image switching means) connected to the BS terminal 15a; and a U/VHF tuner 31 (image switching means) connected to the UHF/VHF terminal 15b. The BS tuner 33 and the U/VHF tuner 31 perform the channel selection in accordance with a channel selection command 31a supplied from the wireless center microcomputer 41 that is associated with a first storage section (EEPROM) 47 (storage means). After the channel selection, the image/audio (AV) signal is supplied to and demodulated by an image/audio demodulator 35. In response to an audio switching command 37a supplied from the wireless center microcomputer 41, an audio switching section 37 performs audio switching so as to switch between (i) the sound from the image/audio demodulator 35 and (ii) information with regard to programs, e.g. EPG (Electrical Program Guide).

The audio signal having been subjected to the audio switching and the image signal are supplied to the first AV selector 43. The first AV selector 43 performs source selection based on a source selection command 43a supplied from the wireless center microcomputer 41, and supplies the audio and image signals to an SS transmission/reception unit 45. In the source selection, one of the following types of information is selected in line with the source selection command 43a: image/audio information supplied from the tuners 31 and 33; information with regard to programs; and external input information from the image-1 input terminal (external input 1) 7a, the image 2 input terminal (external input 2) 7b, and the image 3 input terminal (external input 3) 7c.

The SS transmission/reception unit 45 includes an A/D converter 51, an MPEG2 encoder 53 (encoding means), a first SS wireless transmission/reception engine 55, and a first SS-CPU 57 controlling these members. The image and audio signals and the like, having been subjected to the source selection by the first AV selector 43, are subjected to A/D conversion in the A/D converter 51, and then encoded in the MPEG2 format by, for example, the MPEG2 encoder 53. Based on a TV command 57a supplied from the wireless center microcomputer 41, the first SS wireless transmission/reception engine 55 supplies the MPEG2-encoded data to the TV main body 5, by means of the SS wireless communication system. Also, the first SS wireless transmission/reception engine 55 bi-directionally exchange various types of commands (data) with the TV main body 5, by means of the SS wireless communication system.

The first SS-CPU 57 receives a TV command 57a from the wireless center microcomputer 41. Also, the first SS-CPU 57 sends a TV command 57a, which has been supplied from the TV main body 5, to the wireless center microcomputer 41.

The EEPROM (Electrically Erasable Programmable ROM) (first storage section) 47 is a nonvolatile memory that is electrically rewritable and stores various types of data including communication control data and a program for controlling the wireless center microcomputer 41. The specifications of the wireless center 3 and TV main body 5 can be changed by writing a different program into the EEPROM 47. That is to say, to avoid the time loss on account of the change of mask ROM performed each time debugging is done in system development, a nonvolatile memory, e.g. EPROM and EEPROM, has recently been adopted as a program ROM, in order to considerably shorten the time for program development and remediation. Also, it is possible to easily upgrade and change the functions by replacing a program in the EEPROM with a downloaded program.

The following describes a configuration example of the TV main body 5 with reference to FIG. 3. Note that, the descriptions on members having already been described with reference to FIG. 1 are omitted.

As shown in FIG. 3, the TV main body 5 includes: a TV microcomputer 65 (control means) associated with a second storage section (EEPROM) 73 (storage means); a SS transmission/reception unit 61 (communication means, receiving means, transmission means); a second AV selector 67; an OSD (ON Screen Display) synthesizing section 93; a TV section 71 (display means); and a remote controller light receiving section 75 receiving input from the remote controller (hereinafter, remote controller device) shown in FIG. 5. The SS transmission/reception unit 61 includes a second SS wireless transmission/reception engine 77, an MPEG2 decoder 81 (decoding means), a D/A converter 83, and a second SS-CPU 85 controlling these members. The TV main body 5 is battery-driven, and hence further includes a battery 87b and a battery charger microcomputer 87a that controls the charging/discharging of the battery 87b.

The TV microcomputer 65 includes an image mute section 150 (visual disturbance hiding means), and a switching command generating section 151 (switching command transmission control means).

The streaming information, which is supplied from the wireless center 3 and encoded in the MPEG2 format, is supplied to the second SS wireless transmission/reception engine 77 in the SS transmission/reception unit 61, in response to the instruction of the SS-CPU 85 that received the TV command 85a from the TV microcomputer 65. The streaming information is then decoded in the MPEG decoder 81 and subjected to D/A conversion in the D/A converter 83. In the second AV selector 67, either the image/audio signal thus subjected to the D/A conversion or an external input signal from the image 4 input terminal (external input 4) 21 is selected in line with the source selection command 67a supplied from the TV microcomputer 65. In the OSD synthesizing section 93, the selected signal is subjected to, for instance, an optional OSD process in line with an OSD output command 93a supplied from the TV microcomputer, and then supplied to the TV section 71. Subsequently, audio and visual output based on the image/audio signal is performed on the screen of the TV section 71.

In the SS transmission/reception unit 61, the SS wireless transmission/reception engine 77 bi-directionally exchanges various types of commands (data) with the TV main body 5, by means of the SS wireless communication system. The SS-CPU 85 receives a TV command 85a from the TV microcomputer 65, and sends, to the TV microcomputer 65, a TV command 85a supplied from the wireless center 3.

The EEPROM (second storage section) 73 is a nonvolatile memory that is electrically rewritable and stores various types of data including communication control data and a program for controlling the TV microcomputer 65. The specifications of the TV main body 5 can be changed by writing a different program into the EEPROM 73.

FIG. 4 shows a configuration example of transmission data exchanged between the wireless center 3 (tuner side) and the TV main body 5 (monitor side), in the TV reception/reproduction system 1 of the present embodiment. As shown in the figure, the transmission data 131 is transmitted between the first SS wireless transmission/reception engine 55 and the second SS wireless transmission/reception engine 77, at a predetermined cycle defined as an isocycle 132. As FIG. 4 shows, the wireless center 3, which is the root (R), sends an R packet 133 to the TV main body 5 which is the leaf (L). After a gap 134, the TV main body 5 (leaf (L)) sends an L packet 135 to the wireless center 3 (root (R)). One isocycle 132 then finishes after a gap 136.

The R packet 133 includes a part adopting a long preamble (1 Mbps) and another data part (11 MHz). The part adopting the long preamble (1 Mbps) includes synchronous data (Sync) 141 and PHY header data (PHYHeader) 143. The time length of this part is 192 μs.

On the other hand, the another data part includes MAC header data (MACHeader) 145, control data (CB) 147, asynchronous data (Async) 151, and isochronous data (ISOData) 153. The time length of the data part is 2828 μs. The asynchronous data 151 includes a status command supplied from the wireless center 3 to the TV main body 5. The isochronous data 153 is MPEG2 AV stream data.

Being similar to the R packet 133, the L packet 135 includes a part adopting a long preamble (1 Mbps) and another data part (11 MHz). The part adopting the long preamble (1 Mbps) includes, as in the R packet 133, synchronous data (Sync) 161 and PHY header data (PHYHeader) 163. The time length of this part is 192 μs.

On the other hand, the another data part includes MAC header data (MACHeader) 165, retry tag (RetryTag) 167, and asynchronous data (Async) 171. The time length of the data part is 157.1 μs. The asynchronous data 171 includes a status command supplied from the TV main body 5 to the wireless center 3.

Between the R packet 133 and the L packet 135, a gap (GAP) 134 is provided. The time length of the gap 134 is 120 μs. In a similar manner, between the L packet 135 and the R packet 133, a gap (GAP) 136 is provided. The time length of the gap 136 is 120 μs.

The above-described transmission data 131 in total is transmitted in a 3.6 ms cycle. It is noted that this 3.6 ms cycle is significantly shorter than the delay which is several seconds long.

In the TV reception/reproduction system 1 of the present embodiment, instructions of channel selection and input switching are performed using a remote controller device 200 by which various instructions are made to the TV main body 5. FIG. 5 shows a configuration example of the remote controller device 200. As shown in the figure, the remote controller device 200 includes: a channel number input section 201 by which a channel number is inputted; selection confirming buttons 203; up-down channel selection buttons 205; a power switch 207; and (external) input switching button 208. The channel number input section 201 has direct channel-selection buttons that allow for direct input of channel numbers. The up-down selection buttons 205 allow for the channel selection by "+" and "−". The selection confirming buttons 203 include selection buttons 203a and a confirming button 203b.

Referring to a sequence chart in FIG. 6, the switching between (i) the wireless center microcomputer 41 and SS transmission/reception unit 45 of the wireless center 3 and (ii) the SS transmission/reception unit 61 and TV microcomputer 65 of the TV main body 5 will be described in chronological order. In doing so, channel switching is taken as an example of the aforesaid switching.

For example, a demand of channel switching from the remote controller device 200 is performed in such a manner that the switching command generating section 151 of the TV microcomputer 65 sends a demand command to the switching demand acquiring section 140 of the wireless center microcomputer 41, via the SS transmission/reception unit 61 of the TV main body 5 and the SS transmission/reception unit 45 of the wireless center 3 (101, 103, 105).

In response to this, the wireless center microcomputer 41 returns, to the TV microcomputer 65, a reply (Ack) that confirms the receipt of the command demanding the channel switching, via the SS transmission/reception unit 45 of the wireless center 3 and the SS transmission/reception unit 61 of the TV main body 5 (107, 111, 115). From the SS transmission/reception unit 61 to the TV microcomputer 65, a transmission process reply 104 is also returned. While the replies are returned, the TV microcomputer 65 of the TV main body 5 performs timeout monitoring 117a.

Receiving the command of demanding the channel switching, the wireless center microcomputer 41 carries out a demanded process 118 corresponding to the received command. After the demanded process 118 finishes, the switching demand responding section 141 of the wireless center microcomputer 41 sends, to the TV microcomputer 65, process completion information indicating that the demanded process has already been carried out. The process completion information is transmitted as a process reply (121, 123, 125).

In the present embodiment, after the TV main body 5 received the process reply of the process completion information, the image mute section 150 of the TV microcomputer 65 starts to perform image processing on the image to be displayed on the TV section 71, and continues the image processing for the period stored in the EEPROM 73 or the like in advance. In this manner, the muting for hiding the visual disturbance on account of the delay at the time of channel switching is performed.

The aforesaid period is set in accordance with, for example, a decoding time of a MPEG2-encoded image signal which is decoded in the TV main body 5 and supplied from the wireless center 3. The period is, for instance, set so as to be longer than the decoding time. The period is set in consideration of another delay time in the TV main body 5 in addition to the decoding time. However, since the effect of reduction of the mute period is lowered if the aforesaid period is too long, the period is set in consideration of an appropriate value in addition to the delay time, e.g. a certain degree of margin in addition to an estimated delay time. Note that, in reality, since a process reply transmission 125 has been supplied before an image is displayed on the TV section 71 of the TV main body 5, there is a delay until the image signal is decoded. On this account, the starting time of the muting may be delayed for the aforesaid delay.

Now, a timing of image muting in the TV reception/reproduction system 1 of the present embodiment will be described in comparison with a timing of conventional image muting, in reference to FIG. 7. A conventional image muting signal is generated at a timing of channel selection on the TV main body 5 side by means of the remote controller device 200 or the like, so that the image muting starts at this timing ((b) and (d) in FIG. 7).

On the other hand, in the TV reception/reproduction system 1 of the present invention, the wireless center 3 actually carries out the channel selection in response to a channel selection operation signal supplied from the TV main body 5 to the wireless center 3, and the result of the channel selection is supplied, as a reply signal, to the TV main body 5. An image mute signal is generated at the timing of the receipt of the reply signal by the TV main body 5, and the image muting starts at this timing ((a), (c), and (e) in FIG. 7). Therefore, in reference to FIG. 7, it is possible to understand that, since a period from the channel selection by the TV main body 5 to the actual channel selection by the wireless center 3, the image muting is not performed, and hence the start of the image muting is delayed.

In the TV reception/reproduction system 1 of the present embodiment, the starting time of the image muting is set at a time when a reply indicating that the encoding has actually been done is supplied from the wireless center 3 is supplied, after instructions of channel switching and external input switching are done on the TV main body 5 side. This enables the TV main body 5 side to acquire information regarding the starting time of the image muting, and, because the image muting is performed based on this information, the reference for setting the image mute period is acquired. It is therefore unnecessary to add an unnecessary margin, and hence the image mute period is shortened.

Embodiment 2

Figure 8:
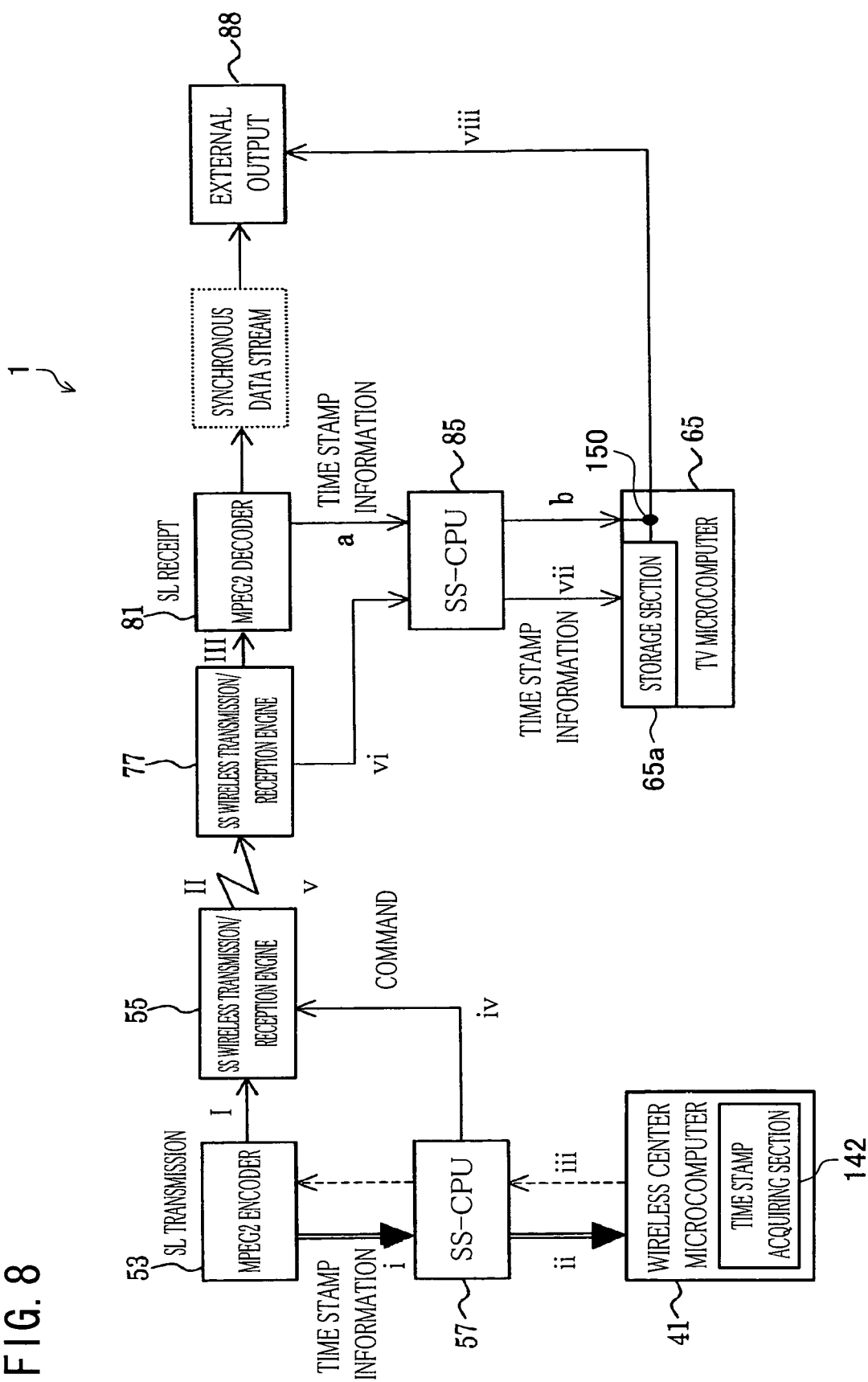
FIG. 8 shows functional blocks showing a simplified structure of a TV reception/reproduction system of another embodiment of the present invention, and particularly shows the flow of information with regard to image muting.
Figure 9:
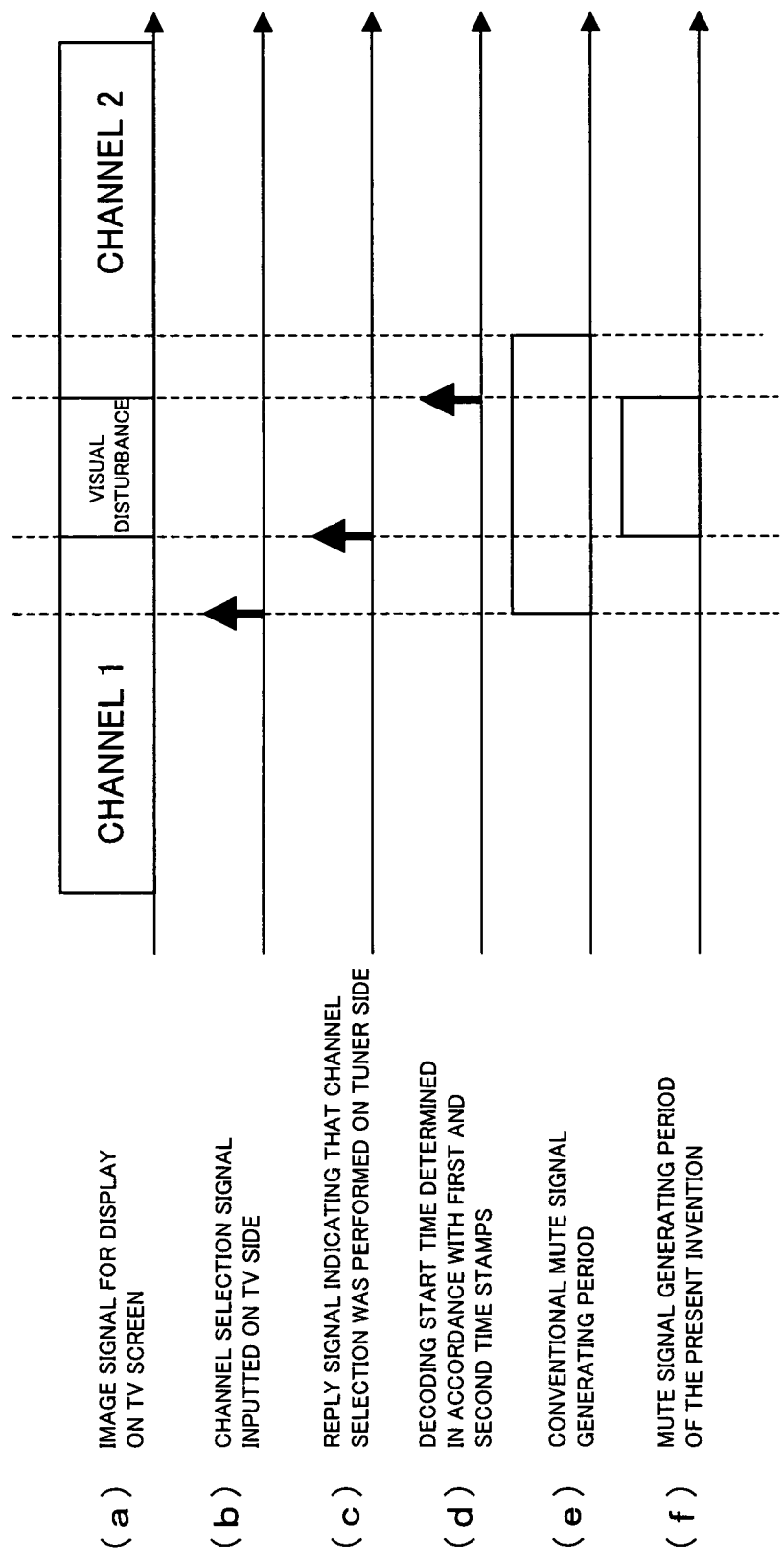
FIG. 9 is a timing chart showing a mute period in the TV reception/reproduction system of FIG. 8, as compared to a conventional mute period.

The following will describe a TV reception/reproduction system of another embodiment of the present invention, with reference to FIGS. 8 and 9. In this embodiment FIGS. 1-6 are also appropriately referred to as well. Note that, members having already been described in Embodiment 1 are given the same numbers and the descriptions thereof are omitted.

The TV reception/reproduction system 1 of the present embodiment is characterized in that, a wireless center 3 includes a time stamp information acquiring section that acquires first time stamp information at the time of encoding broadcast information, and either the acquired first time stamp information or an estimated value is supplied to the TV main body 5 side. The TV reception/reproduction system 1 of the present embodiment is also characterized in that, second time stamp information on the decoder side is outputted to a TV microcomputer 65, and a mute timing is controlled in accordance with the first time stamp information and second time stamp information.

An MPEG2 encoder sets a reference time in control data of MPEG2 TS (Transport Stream), and sends the control data to the decoder at certain intervals. Also, at the time of encoding, the MPEG2 encoder sets a time stamp, which is generated based on a reference time, of an MPEG2 TS packet. Meanwhile, the MPEG2 decoder starts the decoding when the time stamp of a received MPEG2 TS is matched with the aforesaid reference time, as a result of comparison.

FIG. 8 shows functional blocks (corresponding to FIG. 1) showing a simplified structure of the TV reception/reproduction system 1 of the present embodiment, and shows how the information with regard to the image muting flows. In an example of the packet configuration shown in FIG. 4, the. R packet 133 supplied from the wireless center 3 (R) to the TV main body (L) includes isochronous data. (information stream) encoded in the MPEG2 standard. In this MPEG2-encoded isochronous data (information stream) 153, first time stamp information for managing the time of information is incorporated.

The first time stamp information is PCR (Program Clock Reference), in concrete terms. The PCR is information for setting and correcting a value of STC (System Time Clock) that is a time reference in the MPEG2 decoder 81. The MPEG2 decoder 81 operates in reference to a value of the STC. Setting and correcting the STC by the PCR incorporated into the isochronous data 153, synchronization with the MPEG2 encoder 52 is achieved.

In doing so, as shown in FIG. 8, for example, a time stamp acquiring section 142 (time stamp transmission control means) of the wireless center microcomputer 41 acquires, via the first SS-CPU 57, the first time stamp information incorporated into TV information data that is isochronous data encoded in the MPEG2 standard by the MPEG2 encoder 53 (i, ii). The wireless center microcomputer 41 then sends the acquired first time stamp information from the first SS wireless transmission/reception engine 55 to the TV main body 5, via the first SS-CPU 57 (iii, iv, v). The first time stamp information supplied to the TV main body 5 is then forwarded from the SS wireless transmission/reception engine 77 to the TV microcomputer 65 via the second SS-CPU 85 (vi, vii), and stored in the storage section 65a of the TV microcomputer 65.

On the other hand, the image stream encoded in the MPEG2 format is supplied from the first SS wireless transmission/reception engine 55 to the MPEG2 decoder 81 via the second SS wireless transmission/reception engine 77 of the TV main body 5 (I, II, III). The MPEG2 decoder 81 sends the decoded isochronous data stream to an external output terminal 88 of the MPEG2 decoder 81. Meanwhile, the MPEG2 decoder 81 sends the second time stamp information to the TV microcomputer 65 via the second SS-CPU 85, based on the inputted MPEG2 data (a, b).

The second time stamp information is DTS (Decoding Time Stamp), in concrete terms. The DTS is information for managing a time of decoding an image signal in the MPEG2 decoder 81. The decoding of an image signal starts when, in the MPEG2 decoder 81, the DTS is matched with the STC. That is to say, a predetermined time is set in the DTS, and the decoding of the image signal starts when the time clocked by the STC reaches the time set in the DTS.

The TV microcomputer 65 determines the timing of image muting, based on the first time stamp information and second time stamp information stored in the storage section 65a. The TV microcomputer 65 sends the determined timing information to the external output terminal 88 (viii), so as to control the timing of the image muting.

FIG. 9 is a timing chart showing the mute period in the TV reception/reproduction system of the present embodiment, as compared to a conventional mute period. Note that, signals shown in (a), (b), and (c) in FIG. 9 are identical with those shown in (a), (b), and (c) in FIG. 7, so that the descriptions thereof are omitted. According to a conventional image mute signal, a time required for MPEG2 decoding is estimated in advance, an appropriate time is set based on the estimated time, and image muting finishes after the time thus set elapses ((e) in FIG. 9).

In the meantime, in the TV reception/reproduction system 1 of the present invention, the timing at which the MPEG2 decoder 81 starts the decoding of image data is acquired with reference to the first time stamp information and the second time stamp information, and the image muting finishes at this timing ((d) and (f) in FIG. 9). Therefore, one can understand in reference to FIG. 9 that, the image muting starts after the wireless center 3 actually performs channel selection, and finishes at the same time as the start of the decoding of image data, and hence the optimization is realized by eliminating an unnecessary time from the period of image muting.

In the TV reception/reproduction system 1 of the present embodiment, the time stamp information used for actual MPEG2 encoding or decoding is acquired and the mute timing is controlled based on the acquired time stamp information. On this account, it is possible to precisely determine the mute timing.

The TV reception/reproduction system of the wireless AV system of the present invention has been described with specific embodiments. The present invention, however, is not limited to the foregoing descriptions. One skilled in the art may variously change and modify the configurations and functions of the present invention described in the foregoing embodiments and other embodiments, within the spirit and scope of the invention.

For example, although the above-described embodiments took the TV reception/reproduction system as an example, the present invention can be adopted to other types of AV systems. Moreover, although the descriptions were given with reference to an example of wirelessly-associated AV devices, it is obvious that the present invention can be adopted to AV devices networked by wires or the like. Also, even if the muting of an image is taken as an example of the switching, the switching may be another type of image processing.

In the embodiments above, the channel selection and input switching are carried out using the remote controller device 200. Alternatively, the wireless center 3 may automatically switch the image data. In such a case, the switching demand command and the exchange of reply thereto are not required.

In the above-described embodiments, the wireless AV device is a mobile TV. Not limited to this, however, the present invention can be applied to not only a TV receiver but also any kinds of devices having a wireless communication capability or being integrated with a wireless communication capability. For instance, the AV device may be a VTR (Video Tape Recorder) or a HDD/DVD recording/reproduction device. Also, the AV device may be a device capable of performing data transmission/reception, which is combined with an information equipment such as a PC. The present invention can be adopted to any types of systems. In addition, any types of data can be transmitted and received.

The present invention took the TV receiver as an example. Not limited to this, however, the present invention may be adopted to, as described above, a tuner and a personal computer, or another type of AV device adopting a tuner.

The types of the processing sections of the aforesaid wireless communication device and wireless AV system, and the types and formats of the setting information are not limited to those described in the aforesaid embodiments. The present invention can be suitably applied to devices compliant with HAVi (Home Audio/Video Interoperability).

As the tuner, a BS tuner and a UHF/VHF tuner were taken as examples. However, the type of broadcast and the number of the tuners are not limited to the above, and hence a CS (Communications Satellite) tuner and a CATV (Cable Television) tuner may be adopted.

Also, the name of the TV reception/reproduction system in the present embodiment is merely chosen for the sake of convenience. The system may be called wireless communication device, AV device, device control system, or the like.

The wireless AV system described above can be realized by a program for realizing the wireless AV system. Such a program is stored in a computer-readable recording medium. Such a program medium in the present invention may be a main memory, or a program medium may be used which can be read by inserting the recording medium in an external storage device.

In addition, in either of the cases, the contained program may be executed by the access of a CPU. Further, the program may be read and then downloaded to a program storage area (not illustrated) where the program is executed. Assume that the program for download is stored in a main body device in advance.

In addition, the program medium is a recording medium arranged so that it can be separated from the main body. Examples of such a program medium include a tape, such as a magnetic tape and a cassette tape; a magnetic disk, such as a Floppy® disk and a hard disk; an optical disc, such as a CD-ROM/MO/MD/DVD; a card, such as an IC card and optical card; and a semiconductor memory, such as a mask ROM, an EPROM, an EEPROM, or a flash ROM. All these storage media hold a program in a fixed manner.

Alternatively, although not illustrated, if a system includes means that can connects to an external communications network, it is preferable if the program medium is a recording medium carrying the program in a flowing manner as in the downloading of a program via the communication connection means and over the communications network.

Further, when the program is downloaded over a communications network in this manner, the program for download may be stored in a main body device in advance or may be installed from another recording medium. A content stored in the recording medium is not limited to a program, but may be data.

Not limited to the embodiments above, it will be obvious that the present invention may be varied in many ways within the scope thereof. For example, the present invention may be configured as follows.

A wireless AV system of the present invention includes: a wireless center that includes a tuner section for channel selection and a first two-way transmission section that transmits broadcast information of the channel selected by the tuner section and command data requesting the execution of switching-related processes including process of channel selection by the tuner section; and an AV output device that includes a display section, an input section receiving an input for prompting the switching-related processes, a second two-way transmission section that is capable of receiving the broadcast information and exchanging command data with the first two-way transmission section, a conversion section that converts the command data to be transmittable between the first and second two-way transmission sections based on the input operation, and a control section that obtains, from the wireless center and based on the command data, timing information concerning the switching-related processes, so as to control the timing to switch to the image processing for hiding the visual disturbance on account of the delay caused by the switching-related processes, based on the obtained timing information.

In the aforesaid wireless AV system of the present invention, the image processing includes a process of muting an image.

In the aforesaid wireless AV system of the present invention, the control section performs control in such a manner that the image muting switching process of the display section is performed for a first period which starts at the time point when the AV output device receives, from the wireless center, a response indicating that the switching-related processes based on the command data supplied from the AV output device has been completed.

In the aforesaid wireless AV system of the present invention, the first period is determined in consideration of (i) a decoding period during which the encoded broadcast information supplied from the wireless center is decoded in the AV output device, and (ii) a delay time concerning processes other than the decoding.

In the aforesaid wireless AV system of the present invention, the control section performs control so as to cause the display section to carry out the image muting switching process after the first period elapses from the time point at which the AV output device receives the response.

In the aforesaid wireless AV system of the present invention, the first period is determined based on the delay time which is of the processes other than the decoding and is on the AV output device side.

An AV output device of the present invention is associated with a wireless center including a tuner section for channel selection and a first two-way transmission section that transmits broadcasting information selected by the tuner section and command data requesting the execution of switching-related processes including a process of channel selection demanded to the tuner section, the AV output device including: a display section; an input section receiving an input operation prompting the switching-related processes; a second two-way transmission section capable of receiving the broadcast information and exchanging data with the first two-way transmission section; a conversion section that converts the command to be transmittable between the first and second two-way transmission sections, in response to the input operation; and a control section that obtains, from the wireless center, timing information concerning the time of the switching-related processes, and controls an image muting switching timing based on the obtained timing information.

A wireless center of the present invention is associated with an AV output device including a display section and an input section receiving an input operation for requesting the execution of switching-related processes including a process of channel selection, and the wireless center includes a tuner section that performs channel selection in response to the input operation, and a first two-way transmission section that transmits broadcast information selected by the tuner section and timing information regarding a timing of performing the switching-related processes.

A wireless AV system of the present invention includes: a wireless center including a tuner section performing channel selection and a first two-way transmission section that receives command data, which is related to the broadcast information and requests the execution of switching-related processes including channel selection demanded to the tuner section; and an AV output device including a display section, an input section receiving an input operation prompting the switching-related processes, a second two-way transmission section capable of receiving the broadcast information and exchanging data with the first two-way transmission section, a conversion section that converts the command to be transmittable between the first and second two-way transmission sections, in response to the input operation, a time stamp information acquiring section that acquires, from the wireless center, first time stamp information at the time of encoding the broadcasting information, and a control section that controls the image muting switching timing based on the acquired first time stamp information.

In the aforesaid wireless AV system of the present invention, the wireless center has such a function that, in the wireless center, at the time of encoding the broadcast information, the first time stamp information is obtained and supplied to the AV output device side.

In the aforesaid wireless AV system of the present invention, the control section controls the image muting switching timing, based on the first time stamp information and second time stamp information obtained at the time of decoding the broadcast information in the AV output device.

A wireless center of the present invention is associated with an AV output device including a display section and an input section receiving an input operation for prompting switching-related processes including a process of channel selection, and the wireless center includes: a tuner section for channel selection; a first two-way transmission section that transmits broadcast information selected by the tuner section and command data that requests the execution of switching-related processes including channel selection demanded to the tuner section; and a function of obtaining first time stamp information at the time of encoding the broadcast information and sending the obtained first time stamp information to the AV output device.

An AV output device of the present invention is associated with a wireless center including a tuner section for channel selection and a first two-way transmission section that transmits broadcasting information selected by the tuner section and command data requesting the execution of switching-related processes including a process of channel selection demanded to the tuner section, the AV output device including: a display section; an input section that receives an input operation for prompting the tuner section to perform the channel selection; a second two-way transmission section capable of receiving the broadcast information and exchanging data with the first two-way transmission section; a conversion section that converts the command to be transmittable between the first and second two-way transmission sections, in response to the input operation; and a control section that obtains, from the wireless center, first time stamp information at the time of encoding the broadcast information, and controls the image muting switching timing based on the obtained first time stamp information.

In the aforesaid wireless AV system of the present invention, the switching-related processes further includes an input switching process.

A mute period determining method of the present invention is of an AV output device which is wirelessly associated with a wireless center including a tuner section that performs channel selection regarding broadcast information, the AV output device including a display section and an input section that receives an input operation for prompting switching-related processes including a process of channel selection demanded to the tuner section, the method comprising the step of: in response to the input operation, sending, to the wireless center side, a switching-related process command that prompts the switching-related processes; and obtaining, from the wireless center side, timing information regarding a timing of the switching-related processes, so as to determine the image muting switching timing based on the obtained timing information.

In the aforesaid mute period determining method of the present invention, the image muting switching timing is determined based on a time point at which, in the wireless center, the AV output device receives a response indicating that the switching-related processes have been executed.

In the aforesaid mute period determining method of the present invention, the image muting switching timing is at a time point where a part of the period for encoding the broadcast information elapses from the aforesaid time point at which the AV output device receives the response.

A mute period determining method of the present invention is of an AV output device which is wirelessly associated with a wireless center including a tuner section that performs channel selection regarding broadcast information, the AV output device including a display section and an input section that receives an input operation for prompting switching-related processes including a process of channel selection demanded to the tuner section, the method comprising the step of: receiving, from the wireless center, first time stamp obtained at the time of encoding the broadcast information; and controlling an image muting switching timing, based on the first time stamp information and second time stamp information obtained at the time of encoding the broadcast information.

A wireless AV system of the present invention comprises: (i) a tuner-side device including a tuner section performing channel selection, and a first two-way transmission section that transmits broadcast information selected by the tuner section and command data requiring the tuner section to perform switching-related processes including a process of channel selection demanded to the tuner section; and (ii) an AV output device that is detachable to the tuner-side device and includes a display section, an input section that receives an input operation for prompting the switching-related processes, a second two-way transmission section capable of receiving the broadcast information and exchanging the command data with the first two-way transmission section, a conversion section that converts the command data to be transmittable between the first and second two-way transmission sections, in response to the input operation, and a control section that obtains timing information regarding the timing of performing the switching-related processes based on the command data, and based on the obtained timing information, the control section controlling an image muting switching timing by which visual disturbance that occurs for the reason of delay on account of the switching-related processes.

According to this system, the image processing can be performed in consideration of the delay on the tuner side, especially the delay on account of the encoding. On this account, it is possible to shorten a period required for the image processing, by the aforesaid delay. It is noted that the control section preferably performs the image muting switching process of the display section, after the first period elapses from the time point at which the AV output device receives the response. This makes it possible to shorten the mute period.

In the wireless AV system of the present invention, on the occasion of performing the switching processes such as input and channel selection on the AV output device (TV main body) side, it is possible on the TV main body side to accurately grasp the timing of performing the muting to hide the visual disturbance due to the delay on account of, for instance, the processing by an MPEG2 encoder. For this reason, the image mute period is properly set.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

INDUSTRIAL APPLICABILITY

A wireless system of the present invention is useful for an in-home AV network system that wirelessly transmits image and/or audio data such as a wireless TV receiver having a detachable display. Not limited to this, the wireless system of the present invention can also be adopted to various types of wireless communications devices such as a mobile phone, PHS® (Personal Handy-Phone System), and personal digital assistant (PDA).

The invention claimed is:

1. A display device that displays an image based on image data supplied from a center device, the display device comprising:
   a receiver receiving data from the center device; and
   a visual disturbance hiding unit that hides disturbance in the image caused by image switching, in response to the display device receiving, via the receiver, switching-related data indicating information with regard to the image switching of the image data by the center device, the switching-related data being transmitted from the center device (i) as an acknowledgement of receiving a request from the display device for performing the image switching, or (ii) after the center device acknowledges the request for the image switching, the image data being data having been encoded,
   the display device further comprising:
   a decoder that decodes the image data having been encoded,
   the visual disturbance hiding unit starting to hide the disturbance when a certain time elapses from a time point of acquiring the switching-related data, the certain time being shorter than a delay time from receipt of the image data to display of the image by a time required for decoding the image data by the decoder.

2. The display device as defined in claim 1, wherein, the switching-related data is transmitted when the center device completes the image switching.

3. The display device as defined in claim 1, wherein a period during which the visual disturbance hiding unit hides the disturbance is set in accordance with a delay time from receipt of the image data to display of the image.

4. The display device as defined in claim 1, wherein
   a period during which the visual disturbance hiding unit hides the disturbance being set in accordance with a period required for decoding the image data by the decoder.

5. The display device as defined in claim 1, wherein the visual disturbance hiding unit hides the disturbance of the image by stopping displaying the image.

6. The display device as defined in claim 1, further comprising:
   a transmitter transmitting data to the center device; and
   a switching command transmission controller controlling and causing the transmitter to send, to the center device, switching demand data that demands switching of the image data.

7. A display device that displays an image based on image data supplied from a center device, the image data being encoded by the center device, the display device comprising:
   a receiver receiving data from the center device;
   a decoder decoding the image data having been encoded; and
   a visual disturbance hiding unit that hides disturbance of the image caused by image switching of the image data by the center device,
   the visual disturbance hiding unit determining when to stop hiding the disturbance, in accordance with a time point at which the display device receives, separately from the image data having been encoded and before the display device receives the image data having been encoded, via the receiver, a first stamp which is generated when the image data switched by the center device is encoded and which indicates time information for synchronizing encoding performed by the center device with decoding performed by the decoder.

8. The display device as defined in claim 7, wherein
a time when the visual disturbance hiding unit stops hiding the disturbance is determined in accordance with a time point of acquiring the first time stamp, and
a second time stamp indicating when the decoder starts to decode the image data.

9. A center device that transmits image data to a display device in order to display an image on the display device, the center device comprising:
a transmitter transmitting data to the display device;
an image switching unit switching the image data to be transmitted;
an encoder that encodes the image data; and
a switching-related data transmission controller that, when the image switching unit performs image switching so as to switch the image data, obtains switching-related data indicating information regarding the image switching, and controls and causes the transmitter to transmit, independently of the image data, the obtained switching-related data to the display device (i) as an acknowledgement of receiving a request for the image switching from the display device, or (ii) after the center device acknowledges the request for the image switching, as a result, the display device starting to hide the disturbance when a certain time elapses from a time point of acquiring, by the display device, the switching-related data from the center device, the certain time being shorter than a delay time from receipt, by the display device, of the image data to display of the image by a time required for decoding the image data by the display device.

10. The center device as defined in claim 9, wherein the switching-related data is transmitted when the image switching unit completes the image switching.

11. The center device as defined in claim 9, wherein the transmitter transmitting, to the display device, the image data encoded by the encoder.

12. The center device as defined in claim 9, further comprising:
a receiver receiving data from the display device;
a switching demand acquiring unit configured to acquire, via the receiver, switching demand data that demands switching of the image data; and
an image switching controller controlling and causing the image switching unit to switch the image data in accordance with the switching demand data obtained by the switching demand acquiring unit.

13. The center device as defined in claim 9, wherein the image switching unit is a tuner for selecting image data of being currently broadcast.

14. The center device as defined in claim 9, wherein the image switching unit is a selector that selects one of sets of image data supplied from outside.

15. An image display system, wherein the center device defined in claim 9 sends the image data to the display device, and the display device displays an image based on the image data.

16. The image display system as defined in claim 15, wherein the display device is attachable to the center device.

17. A center device that transmits image data to a display device in order to display an image on the display device, the center device comprising:
a transmitter transmitting data to the display device;
an image switching unit switching the image data to be transmitted;
an encoder configured to encode the image data; and
a time stamp transmission controller that controls and causes the transmitter to obtain a first time stamp which is generated when the encoder encodes the image data switched by the image switching unit and which indicates time information for synchronizing encoding performed by the encoder with decoding performed by the display device, and to transmit the obtained first time stamp to the display device, separately from the image data having been encoded and before the image data having been encoded is transmitted.

18. A display device control method for controlling a display device that displays an image based on image data supplied from a center device, the method comprising:
transmitting to the center device a request for switching the image data;
receiving from the center device switching-related data indicating information which is transmitted, when the center device performs image switching of the image data, (i) as an acknowledgement of the request for the image switching, or (ii) after the center device acknowledges the request for the image switching; and
hiding, upon reception of the switching-related data, visual disturbance as a result of the image switching,
the image data being encoded data,
the visual disturbance hiding unit starting to hide the disturbance when a certain time elapses from a time point of acquiring the switching-related data, the certain time being shorter than a delay time from receipt of the image data to display of the image by a time required for decoding the image data by a decoder that decodes the image data having been encoded.

19. A computer-readable recording medium encoded with instructions, wherein the instructions when executed by a computer cause the computer to perform the method recited in claim 18.

20. A display device control method for controlling a display device that displays an image based on image data supplied from a center device, the method comprising:
hiding disturbance of the image caused by image switching of the image data by the center device;
receiving a first time stamp separately from the image data having been encoded and before receiving the image data having been encoded, the first time stamp being generated when the image data switched by the center device is encoded, the first time stamp indicating time information for synchronizing encoding thus performed by the center device with decoding of the image data having been encoded, the decoding performed by the display device; and
determining a time to stop hiding the disturbance, based on a time when the display device receives the first time stamp.

21. A center device control method for controlling a center device that sends image data to a display device in order to display an image on the display device, the method comprising:
receiving a request for performing image switching;
performing image switching of the image data to be transmitted;
encoding the image data
obtaining, in a case where the image switching is performed, switching-related data indicating information regarding the image switching; and
transmitting obtained switching-related data from the center device to the display device independently of the image data (i) as an acknowledgement of receiving the request for performing image switching or (ii) after the center device acknowledges the request for the image switching, as a result, the display device starting to hide the disturbance when a certain time elapses from a time point of acquiring, by the display device, the switching-related data from the center device, the certain time being shorter than a delay time from receipt, by the display device, of the image data to display of the image by a time required for decoding the image data by the display device.

22. A computer-readable recording medium encoded with instructions, wherein the instructions when executed by a computer cause the computer to perform the method recited in claim 21.

23. A center device control method for controlling a center device that transmits image data to a display device in order to display an image on the display device, the method comprising:

switching the image data to be transmitted;
  encoding the image data;
  generating a first time stamp indicating time information for synchronizing the encoding performed by the center device with decoding of the image data having been encoded, the decoding performed by the display device, when the image data is encoded in the encoding; and
  transmitting the first time stamp to the display device separately from the image data having been encoded and before transmitting the image data having been encoded to the display device.

* * * * *